US009110712B2

(12) United States Patent  
Kalavacharla et al.

(10) Patent No.: US 9,110,712 B2
(45) Date of Patent: Aug. 18, 2015

(54) METHOD FOR ENCAPSULATING LOGICAL UNITS OF WORK USING BUSINESS OBJECTS

(75) Inventors: Muralidhar Kalavacharla, San Jose, CA (US); Zafrulla Khan, Fremont, CA (US); Peter Bow Kwong Lee, Foster City, CA (US); Danyiel Amii Louis, San Mateo, CA (US); Sandeep Raghav, Fremont, CA (US); Alan Michael Wintroub, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 11/149,647

(22) Filed: Jun. 10, 2005

(65) Prior Publication Data

US 2006/0282400 A1 Dec. 14, 2006

(51) Int. Cl.
*G06F 7/00* (2006.01)
*G06F 17/30* (2006.01)
*G06F 9/46* (2006.01)

(52) U.S. Cl.
CPC .......... *G06F 9/466* (2013.01); *G06F 17/30206* (2013.01); *G06F 17/30943* (2013.01)

(58) Field of Classification Search
CPC ..... G06F 30/943; G06F 30/864; G06F 30/89; G06F 30/997; G06F 9/466; G06F 17/30206; G06Q 30/00
See application file for complete search history.

(56) References Cited

U.S. PATENT DOCUMENTS

| 5,371,886 | A | | 12/1994 | Britton et al. ................. 395/600 |
| 5,475,836 | A | * | 12/1995 | Harris et al. ........................... 1/1 |
| 5,764,897 | A | * | 6/1998 | Khalidi ........................ 709/201 |
| 5,781,905 | A | * | 7/1998 | Awane et al. ........................ 1/1 |
| 5,933,492 | A | * | 8/1999 | Turovski ................. 379/265.02 |
| 5,960,410 | A | * | 9/1999 | Halpern ......................... 705/21 |
| 6,128,611 | A | * | 10/2000 | Doan et al. ................... 707/779 |
| 6,141,660 | A | | 10/2000 | Bach et al. .................... 707/103 |
| 6,240,422 | B1 | * | 5/2001 | Atkins et al. .................. 719/315 |
| 6,275,863 | B1 | * | 8/2001 | Leff et al. ..................... 709/248 |
| 6,289,393 | B1 | * | 9/2001 | Phillips et al. ................ 719/315 |
| 6,301,606 | B1 | * | 10/2001 | Chessell et al. .............. 709/203 |

(Continued)

OTHER PUBLICATIONS

By David Lawrence Epstein, Cameron Majidi, "At the heart of an enterprise part 2: how WebSphere BI Server creates a hub-and-spoke architecture WebSphere Journal", Aug. 2004.

(Continued)

*Primary Examiner* — Daniel Kuddus
(74) *Attorney, Agent, or Firm* — Kunzler Law Group (57) ABSTRACT

A method for processing a data transaction using a single business object includes providing a transaction business object encapsulating multiple function calls for completing a data transaction. The transaction business object includes an execution sequence indicating the order the function calls should be executed. In certain embodiments, the transaction business object is assigned an operation indicating an action to be taken on data in the transaction business object. This operation is used, in selected embodiments, to determine the function calls and execution sequence that are used to process the transaction business object.

20 Claims, 9 Drawing Sheets

(56) References Cited

U.S. PATENT DOCUMENTS

| | | |
|---|---|---|
| 6,571,232 B1 | 5/2003 | Goldberg et al. ............... 707/2 |
| 6,816,883 B2 | 11/2004 | Baumeister et al. ......... 709/203 |
| 7,069,270 B1* | 6/2006 | Kumar ............................... 1/1 |
| 7,289,964 B1* | 10/2007 | Bowman-Amuah ........... 705/1.1 |
| 2002/0083099 A1* | 6/2002 | Knauss et al. ................ 707/513 |
| 2002/0128996 A1* | 9/2002 | Reed ................................ 707/1 |
| 2003/0093470 A1* | 5/2003 | Upton .......................... 709/203 |
| 2004/0025169 A1* | 2/2004 | Wiser et al. .................. 719/315 |
| 2005/0055384 A1* | 3/2005 | Ganesh et al. ............... 707/202 |
| 2006/0031225 A1* | 2/2006 | Palmeri et al. ................. 707/10 |
| 2006/0230044 A1* | 10/2006 | Utiger ............................ 707/10 |

OTHER PUBLICATIONS

"Introduction toTransactions" ASA User's Guide, http://manuals.sybase.com/onlinebooks/group-sas/awg0703e/dbugen7@Generic__BookTextView/30488.

* cited by examiner

METHOD FOR ENCAPSULATING LOGICAL UNITS OF WORK USING BUSINESS OBJECTS

BACKGROUND OF THE INVENTION

1. Field of the Invention

This invention relates to processing logical units of work and more particularly to methods for encapsulating operations comprising logical units of work into a single business object.

2. Description of the Related Art

One of the fundamental challenges in enterprise application integration is enabling smooth data flow between disparate applications. To improve the flow of data, one primary objective when integrating enterprise applications is to simplify the interaction with an enterprise application to improve the integration model already published for the application. One interaction that may create special challenges when integrating with enterprise information systems in that of transaction processing.

A transaction is an indivisible set of operations forming a logical unit of work that must be executed in an enterprise information system (EIS) either in its entirety or not at all. Transactions maintain data integrity and ensure that the data in an EIS will always be in a consistent state. A transaction should normally end with either a COMMIT or a ROLLBACK operation. If a transaction is successful, changes made to the EIS are committed (i.e., made permanent). If the transaction fails, changes to the EIS are rolled back to their original state.

For example, where a database or other data repository handles financial accounts, money may be transferred between accounts. This requires a debit from one account and a credit to another. Before the debit or credit occurs, the database is in a consistent state. However, in the interval after the debit has occurred but before the credit has occurred, the database is in an inconsistent state. Absent protective measures, a database failure or other interruption during this interval could result in the performance of only half of the transaction, potentially impairing the data integrity of the database.

In some cases where a client interfaces with an enterprise information system, a single client must call or execute the entire set of operations making up a transaction in order to successfully complete the transaction. For example, to change the address in an employee record, the client locks the record, makes the desired address change, and then unlocks the record. While the record is locked, other clients are unable to access the record. If more than one client were able to access and modify the record concurrently, problems could result such as retrieving bad data or deleting data that the other client needs.

Transactions requiring execution by a single client may create a special problem where enterprise information systems are tied into an integrated "hub-and-spoke" environment. Instead of being directly connected, clients and enterprise information systems communicate with a centralized hub, also referred to as an integration broker. In such a system, clients and enterprise information systems may communicate and exchange data through the integration broker without having any knowledge of the other's data conventions and processing requirements.

Due to the architecture of a hub-and-spoke integration system, the integration broker may process each operation of a transaction as a separate task using different threads. However resource locking requirements combined with distribution of operations for a single transaction among multiple clients or threads, may prevent a transaction from being processed. Thus, transaction processing may be problematic in a hub-and-spoke architecture where transactions are routed through a centralized integration broker.

Accordingly, what are needed are methods for facilitating transaction processing in an integrated environment. Further needed are methods for transmitting an entire transaction over a single communication connection in an integrated environment. Such methods are disclosed herein.

SUMMARY OF THE INVENTION

The present invention has been developed in response to the present state of the art, and in particular, in response to the problems and needs in the art that have not yet been fully solved by currently available apparatus and methods. Accordingly, the present invention has been developed to provide apparatus, systems, and methods for creating and processing business objects encapsulating a logical unit of work that overcomes many or all of the above-discussed shortcomings in the art.

In certain embodiments, a method for processing a data transaction using a single business object includes receiving a business object and identifying the business object as a transaction business object. The transaction business object encapsulates multiple application interface function calls required to perform a data transaction. The method further includes determining an execution sequence for the function calls and executing each of the function calls according to the execution sequence.

In certain embodiments, identifying includes determining a type associated with the business object. This type identifies the business object as a transaction business object. Likewise, the method may include identifying an operation corresponding to the transaction business object. Allowable operations include, for example, a create, a retrieve, an update, and a delete operation. In certain embodiments, the operation is used to identify one or more function calls used to process a logical unit work by extracting these functions calls from a transaction business object definition. Likewise, the operation selected may also identify the execution sequence of the function calls, which may also be extracted from the transaction business object definition. Although other formats are possible, in certain embodiments, the transaction business object definition is stored in an XML schema file.

In certain embodiments, the method includes executing one or more COMMIT operations to save changes made by the function calls. Likewise, in the event that one or more of the function calls are unsuccessful, the method may include rolling back function calls that have been executed. For example, the method may include rolling back the function calls in the event a communication connection is terminated before all of the function calls are executed, or if one or more function calls fails to execute successfully. In certain embodiments, a method in accordance with the invention may also include mapping data values set by one or more function calls into subsequent function calls.

In another embodiment in accordance with the invention, a computer program product comprising a computer readable medium having computer usable program code for processing a data transaction using a single business object is used to perform the above-stated method. In another embodiment, an apparatus incorporating the above-recited computer program product may include modules configured to implement the usable program code for processing a data transaction using a single business object. Likewise, in another embodiment, a system including an integration broker and a destination application coupled together by an integration adapter is implemented using the above-recited computer program product. In certain embodiments, the destination application is an enterprise information system.

In another embodiment in accordance with the invention, a service method for providing a transaction business object to an end user includes obtaining a set of transaction requirements from the end user, determining one or more function calls to satisfy the transaction requirements, generating a transaction business object and associated transaction business object definition encapsulating the functions calls, and delivering the transaction business object and associated transaction business object definition to the end user.

In certain embodiments, generating a transaction business object and associated transaction business object definition may include establishing an execution sequence for the functions calls, selecting an operation corresponding to the function calls, such as a create, update, or delete operation, specifying optional parameters for at least one of the function calls, and positioning a COMMIT operation after one or more of the function calls.

In selected embodiments, generating a transaction business object and associated transaction business object definition may also include mapping data returned from a one function call into a subsequent function call. This mapping may include storing data returned from one function call and inserting the data into a subsequent function call. Finally, once the transaction business object is generated, the service method may include testing and debugging the transaction business object and associated transaction business object definition.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered limiting of its scope, the invention will be described and explained with additional specificity and detail through the use of the accompanying drawings, in which:

FIG. 8 is an illustration of one embodiment of a graphical user interface for mapping data returned from one function call into a subsequent function call.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are disclosed to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose of the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable storage medium can be any apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

For the purpose of this description, the term "function call" is used to mean any method, function, subroutine, protocol, request or data structure, class definition, or object that includes executable instructions for implementing an operation used to interface with or access the facilities of an application, operating system, program, or like system.

Figure 1:
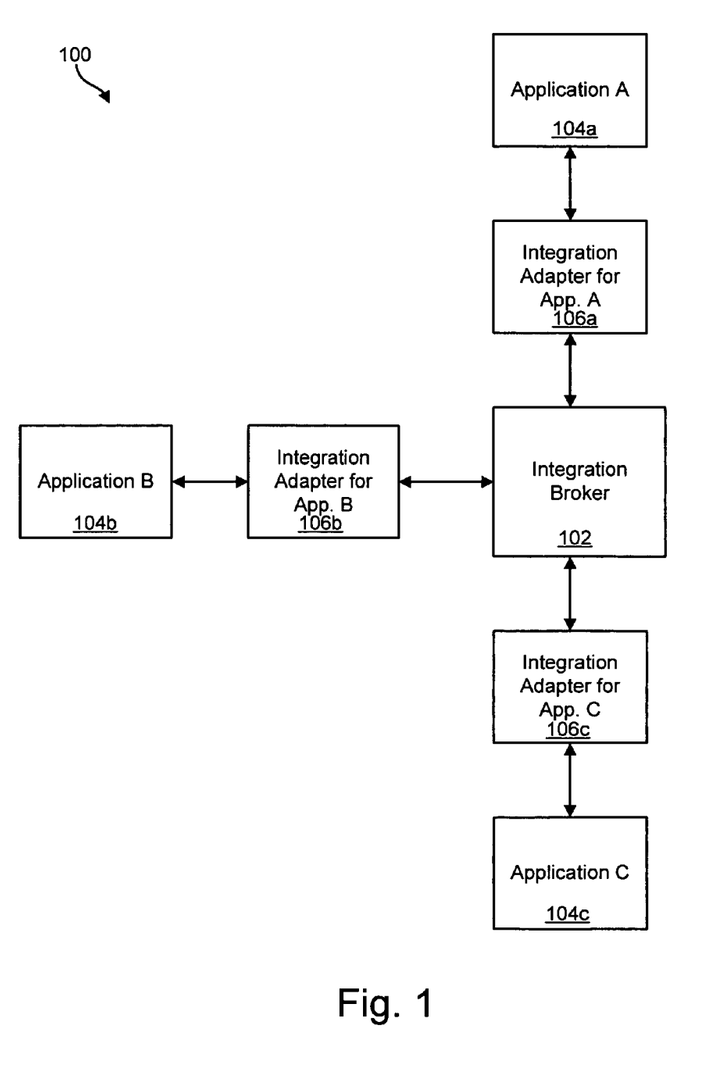
FIG. 1 is a high-level block diagram illustrating one embodiment of an business integration system.

Referring to FIG. 1, a business integration system 100 may be used to route information between various heterogeneous enterprise applications. In certain embodiments, a business integration system 100 may include an integration broker 102, acting as a hub, to mediate the exchange of data between one or more heterogeneous applications 104a-c, acting as spokes on the hub. Because each of the applications 104a-c may provide a distinct interface to external applications and handle data in a unique manner, integration adapters 106a-c may be used to provide an interface between the integration broker 102 and the individual applications 104a-c. These integration adapters 106a-c may provide a generic framework to connect to the integration broker 102 and an application-specific interface to interact with each application 104a-c. As the number of applications 104a-c increases, this hub-and-spoke configuration may be less expensive and more efficient than a point-to-point system. This is because the hub-and-spoke system simply requires an adapter connecting the application to the hub, whereas a point-to-point system may require a separate adapter between each heterogeneous pair of applications.

Data may be exchanged between the applications 104a-c by way of application-specific business objects, which may be transported between the integration adapters 106a-c and the integration broker 102. The integration broker 102 may transport and process these business objects without requiring the originating applications 104a-c to have any knowledge of the data conventions and requirements of the applications 104a-c receiving the objects. These business objects may encapsulate data regarding new or changed data from a source application to a destination application, requests for data from a source application to a destination application, or data sent by an application in response to a request for data by another application. In addition to the data, the business objects may include instructions encoded as metadata that specify, for example, how to process the business objects or how to locate data in a specific application.

Figure 2:
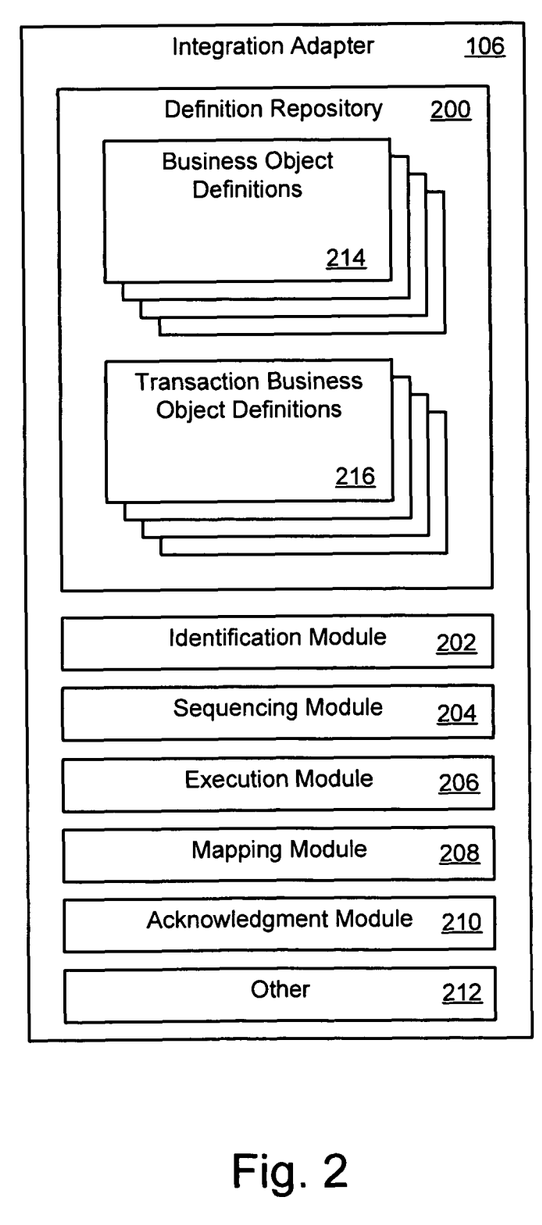
FIG. 2 is block diagram illustrating one embodiment of an integration adapter.
Figure 3:
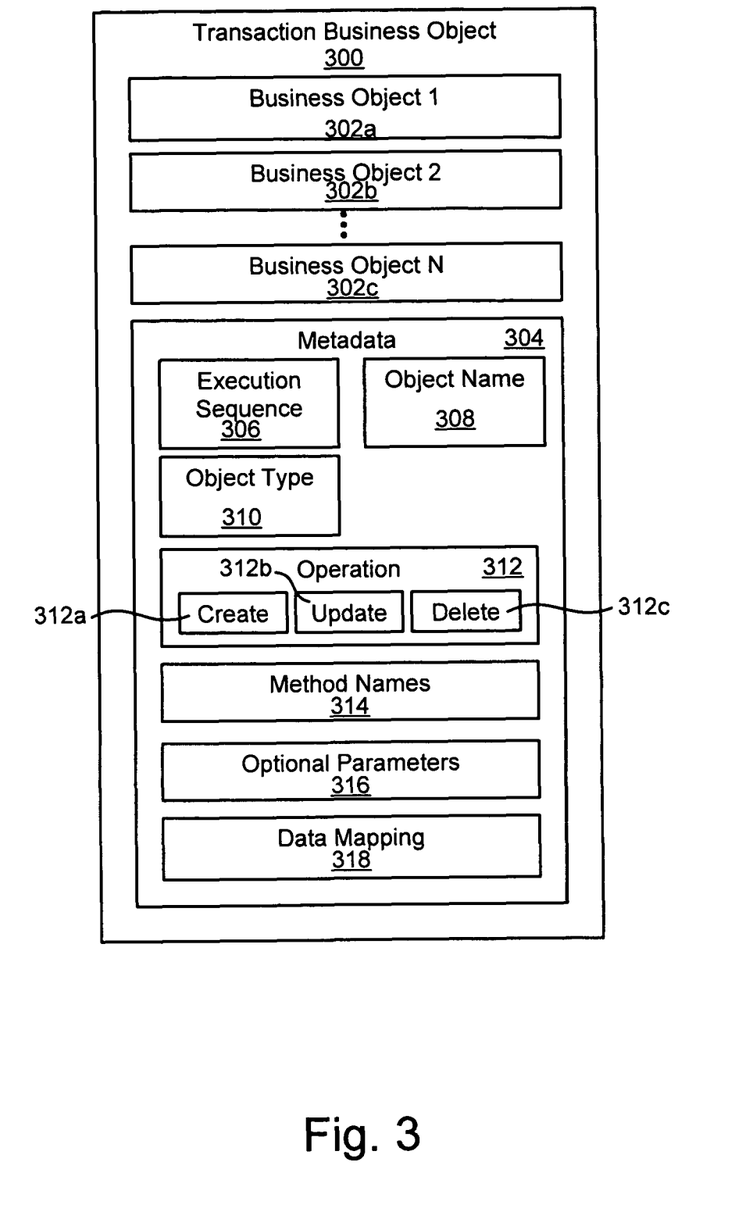
FIG. 3 is a block diagram of one embodiment of a transaction business object in accordance with the invention.

Referring to FIGS. 2 and 3, in certain embodiments an integration adapter 106 may include a definition repository 200, an identification module 202, a sequencing module 204, an execution module 206, a mapping module 208, an acknowledgment module 210, as well as other modules 212. An integration adapter 106 may include a definition repository 200 to store business object definitions 214 that define data to be communicated to other applications. These business object definitions 214 may be stored in the repository 200 when the adapter 106 is configured and may be created or generated by an object generation utility as will be discussed in relation to FIG. 6 below. In certain embodiments, the definitions are stored in XML schema files stored in the data repository. When an integration adapter 106 sends data to the integration broker 102, it instantiates a business object from one of the business object definitions 214 supported in the repository 200 and forwards it to the integration broker 102.

Likewise, one or more transaction business object definitions 216 in accordance with the invention may also be stored in the data repository 200. For the purposes of this description, the block diagram of FIG. 3 represents one embodiment of an instance of a transaction business object 300 in accordance with a transaction business object definition 216 illustrated in FIG. 2. Likewise, the individual business objects 302a-c represent instances of the business object definitions 214. Instances 300, 302 of these business object definitions 214, 216 are created at runtime and are typically not stored in the definition repository 200.

A transaction business object 300 in accordance with one embodiment may comprise an object wrapper encapsulating multiple business objects 302a-c needed to complete a transaction, or a logical unit of work. For example, for an application to update an address field in an employee's database record, three separate functions calls are often needed: (1) the employee record is first locked; (2) the address is changed; and (3) the record is unlocked. For the transaction to succeed, all three of the function calls must succeed. If unsuccessful, the transaction will fail and changes made to the record will be rolled back. A separate business object definition 214 (See FIG. 2) may exist in the repository 200 for each of these function calls. To ensure that all three function calls are handled atomically, the transaction business object 300 encapsulates business objects 302a-c corresponding to each of these function calls. When the integration adapter 106 processes the transaction business object 300, each of these function calls is preferably processed using the same physical connection to the application 104a-c, such as a database management system or other repository.

As described above, a transaction business object 300 in accordance with the invention may be used to encapsulate business objects 302a-c corresponding to one or more function calls and containing actual data. The transaction business object 300 may also include metadata 304 containing application-specific instructions for processing the transaction business object 300. This metadata 304 may be stored in the form of XML annotations included in the transaction business object definition 216 that is instantiated to create the transaction business object 300.

In certain embodiments, the metadata 304 may include information corresponding to the execution sequence 306 of the function calls. The execution sequence 306 defines the order for executing an action associated with each encapsulated business object 302*a-c*. As was described above, the execution sequence 306 may be important to successfully completing a transaction. Likewise, the metadata 304 may include a name 308 for the transaction business object 300. This name 308 may be important to distinguish the transaction business object from other transaction business objects. In addition, the name 308 may be used to identify the business object as a transaction business object. In certain embodiments, the name 308 of a transaction business object 300 may include a prefix or suffix such as "Txn" (e.g., "sapBAPISalesTxn") to identify the object as a transaction business object 300.

A transaction business object 300 may also be characterized by a type identifier 310 (e.g., BAPITXN) identifying the type of business object. Like the name 308, the type 310 may be used to identify one transaction business object from other transaction business objects and to distinguish a transaction business object 300 from a business object.

In certain embodiments, the metadata 304 may also designate an operation 312 corresponding to the transaction business object 300. This operation 312 indicates an action to be taken on data in the transaction business object 300, such as create, update, or delete. While a transaction business object definition 216 may support multiple operations 312*a-c*, the transaction business object 300 itself is characterized by a single operation 312.

Similarly, the metadata 304 may include various methods 314 (i.e., specific names for the function calls, etc.) corresponding to a transaction business object's operation 312. For example, for a given operation (e.g., create), the integration adapter 106 may use a first set of function calls and a corresponding execution sequence to achieve a desired action. Similarly, for another operation (e.g., update), the integration adapter 106 may use a second set of function calls and a corresponding execution sequence to achieve a different action. Thus, the integration adapter 106 may process the transaction business object 300 differently based on the designated operation 312.

In selected embodiments, the metadata 304 may define optional parameters 316 for data in the transaction business object 300. For example, optional parameters 316 may include the name of a database table or column where data should be stored. The integration adapter 106 may use these parameters 316 to process the transaction business object 300 at runtime. Similarly, where optional parameters 316 are not needed, functionality corresponding to these parameters may be removed from the transaction business object 300 to reduce the transaction business object's size and improve processing performance.

In other embodiments, the transaction business object 300 may enable data returned from one function call to be mapped into a subsequent function call. The data mapping information 318 defines how this mapping is to be performed. Specifically, the mapping information 318 defines a source attribute and a target attribute for a mapping. This option may be useful in situations where data returned from a function call is needed or useful in processing a subsequent function call. For example, business object attributes that depend on the existence of the other such as foreign key relationships are one example of where a mapping may be used. The use of data mapping information 318 will be described in additional detail in the description of FIGS. 6 and 8.

Referring now back to FIG. 2, to process a transaction business object 300 received through the business integration system 100, the integration adapter 106 may include an identification module 202 to identify a received business object as a transaction business object 300. For example, as previously discussed, the identification module 202 may identify a transaction business object 300 by reading the object's name 308 or type 310 from the metadata 304. Likewise, the integration adapter 106 may include a sequencing module 204 to determine the proper execution sequence of function calls corresponding to the business objects 302*a-c* within the transaction business object 300. The sequencing module 204 preferably reads and follows the execution sequence 306. As previously discussed, this execution sequence 306 may depend on the selected operation 312.

An execution module 206 may be used to execute each of the function calls encapsulated by the transaction business object 300 according to the execution sequence 306. To determine what function calls are needed to process the transaction business object 300, the execution module 206 may examine the operation 312, the execution sequence 306 and methods 314 (e.g., function calls) that correspond to the operation 312, as well as other application-specific metadata 304 such as optional parameters 316 that provide additional processing information.

A mapping module 208 may be used to process data mapping information 318 contained in the transaction business object 300. This may include storing data received from a first function call, retrieving the data before calling a subsequent function call, and inserting the data into an attribute for a subsequent function call when that function call is executed. An optional acknowledgment module 210 may be used to send an acknowledgment signal when the transaction business object 300 has been successfully processed by the integration adapter 106. Likewise, the integration adapter 106 may include other modules 212 as needed. The other modules 212 may be used to implement other features and functions of the integration adapter 106.

Figure 4:
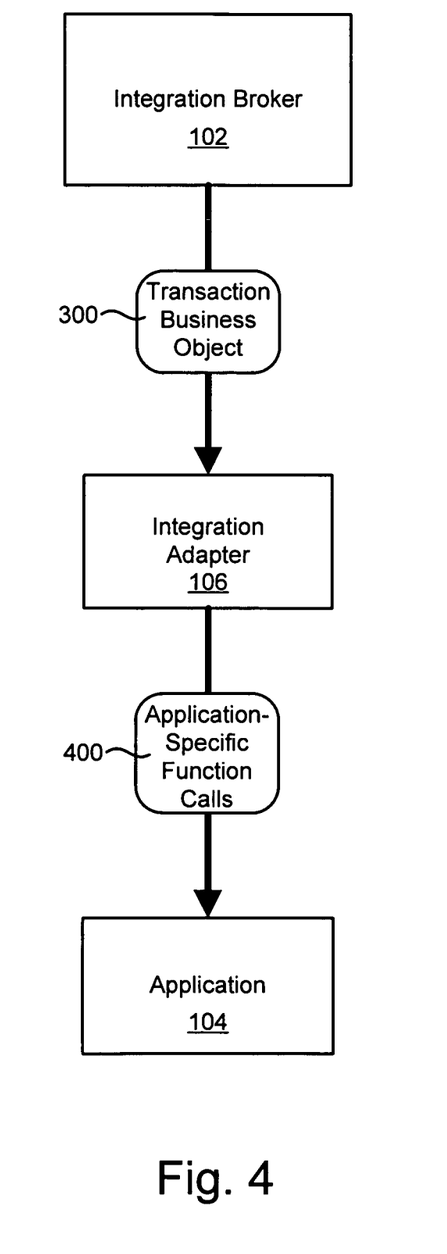
FIG. 4 is a flow chart diagram illustrating the interaction between an integration broker, an integration adapter, and an application.

Referring to FIG. 4, an integration broker 102 is configured to transport a transaction business object 300 encapsulating a transaction, or a logical unit of work, to the integration adapter 106. The integration adapter 106 may then deconstruct the transaction business object 300, by processing both the data and metadata 304 in the object 300, into multiple function calls 400 for completing a logical unit of work. These function calls 400 may be application-specific and may be executed over a single communication connection with the application 104. An application 104 may include, for example, various enterprise information systems (EIS), such as legacy database systems, enterprise resource planning (ERP) systems, or mainframe transaction processing systems. Optionally, the integration adapter 106 may send any acknowledgements or resulting business objects back to the integration broker 102. The integration broker 102 may then communicate success or failure of the transaction to an application 104.

Figure 5:
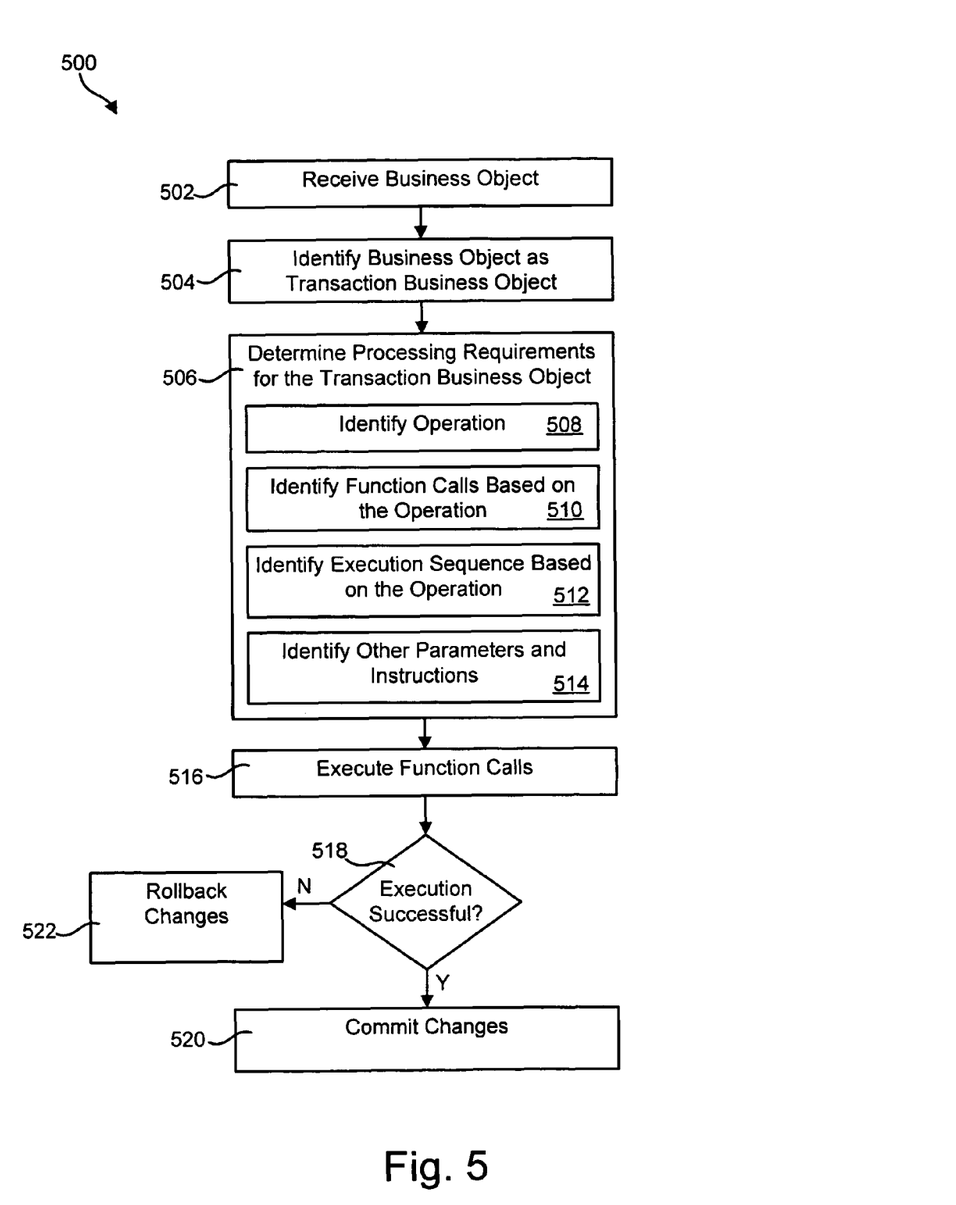
FIG. 5 is a flow chart diagram of one embodiment of a process for processing a transaction business object.

Referring to FIG. 5, in selected embodiments, a method 500 for processing a transaction business object 300 may include receiving 502 a business object and identifying 504 the business object as a transaction business object 300. The transaction business object 300 may be identified by its name 308, type 310, or other characteristic as previously discussed. Once identified, the transaction business object's processing requirements are determined 506. Determining processing requirements may include identifying 508 an operation (i.e., create, update, or delete), identifying 510 function calls that correspond to the operation, and identifying 512 an execution sequence corresponding to the operation. Determining processing requirements may also include identifying 514 other parameters, instructions, and application-specific information for processing the transaction business object 300. Any or all of this information may be stored in the transaction business object's metadata 304.

Once processing requirements are determined 506, the resulting function calls are called/executed 516 to process the transaction in the application 104 (See FIG. 1). If these function calls are executed successfully 518, the resulting changes may be committed 520, or saved, to the application 104. If one or more of the function calls are not successfully executed, any changes made to the application 104 are rolled back 522. For example, such a rollback 522 may be needed if a function call encounters an error or a communication connection with the application 104 is terminated before all of the function calls are executed or before receiving an acknowledgment from the application 104 that all function calls were executed successfully.

Figure 6:
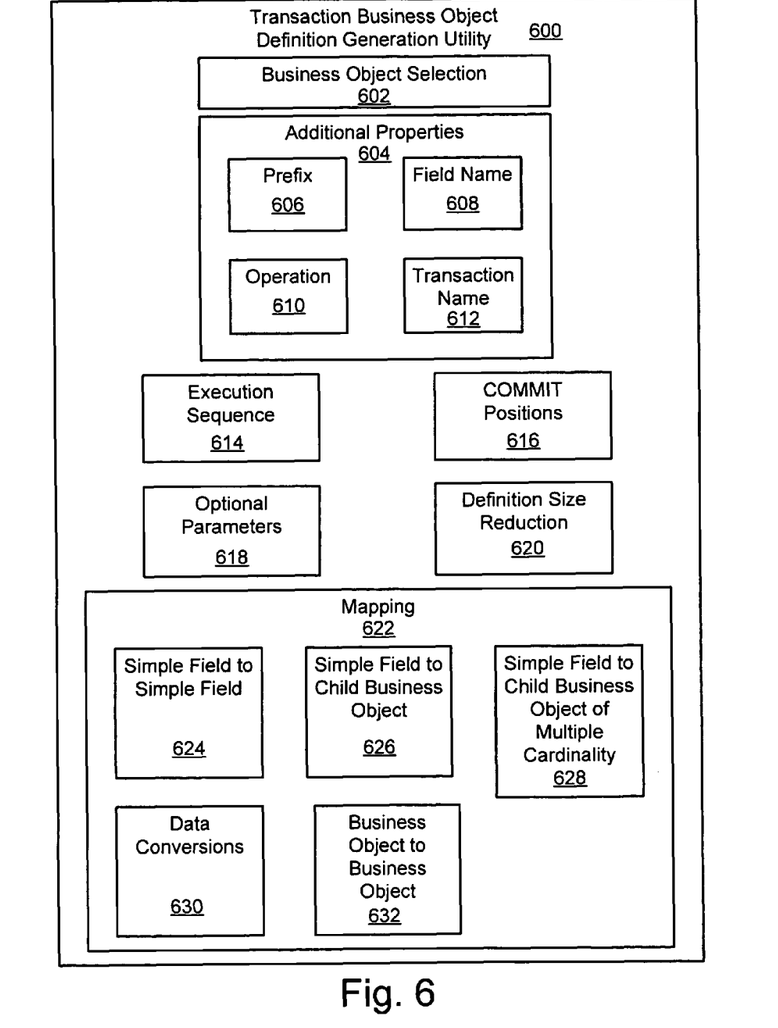
FIG. 6 is a block diagram of one embodiment of a transaction business object definition generation utility in accordance with the invention.

Referring to FIG. 6, a definition generation utility 600 may be used to generate transaction business object definitions 216 encapsulating logical units of work. These definitions 216 may be stored in a definition repository 200 and may be accessed by integration adapters 106 when generating transaction business objects 300.

To create these definitions 216, a selection module 602 of the utility 600 enables a user to select multiple business objects, making up a transaction, for inclusion in the transaction business object 300. Preferably, the business objects are those defined as an external interface to the application 104.

In one embodiment, when a user selects more than one business object for generation, the utility 600 automatically queries the user whether he or she would like to create a transaction business object (transaction business object definition 216). If the user chooses this option, the utility 600 may query the user for additional properties 604. Additional properties 604 may include, for example, a prefix 606, a field name 608, an operation 610, and a transaction name 612.

The user may select a prefix 606 which will be appended to the name 308 of the transaction business object 300 and to the name of each business object 302 ecapsulated within the transaction business object 300. The user may also enter a field name 608 which specifies, for example, a database table or other location where data is to be located or stored. The user may also select an operation 610 (e.g., create, update, or delete) indicating an action to be taken on data in the transaction business object 300. The user may also select a name 612 for the transaction business object 300.

The utility 600 may also allow the user to establish an execution sequence 614 corresponding to the operation 610 selected above. This execution sequence 614 and operation 610 may be stored in the metadata 304 of the transaction business object 300 as the execution sequence 306 and operation 312, described above. When selecting business object definitions 214 for inclusion in the transaction business object definition 216, the utility 600 may also enable a user to define COMMIT positions 616 between or after one or more of the function calls to commit changes to the application 104. Likewise, the utility 600 may allow a user to enter optional parameters 618 for any or all of the function calls and, in the event one or more optional parameters 618 are not used, a reduction module 620 may reduce the size of the transaction business object 300 by removing functionality for unused parameters and/or unused options. In certain embodiments, the utility 600 may enforce certain rules about how function calls are ordered, where COMMIT operations are positioned, and the like. These rules are described in more detail in relation to FIG. 7.

The utility 600 may also enable a user to define a data mapping 622 between function calls. This feature may be used to map data returned from one function call, having an export field, into the import field of a subsequent function call. In selected embodiments, certain types of mappings may be defined. For example, in a first mapping type 624, a simple field property from one business object may be mapped into a simple field property of another business object. A simple field property may correspond to an attribute for an object. In a second mapping type 626, a simple field property may be mapped into a property of a child business object. In a third mapping type 628, a simple field property may be mapped into a property for all instances of a child business object of multiple cardinality. Hence, the property for each child business object may receive the simple field property. Furthermore, where business objects contain field names that are identical, a fourth mapping type 630 may map the data from one business object into another business object. In some embodiments, a fifth mapping type 632 may provide for a data conversion where data is mapped from a field of one type into a field of another type.

Figure 7:
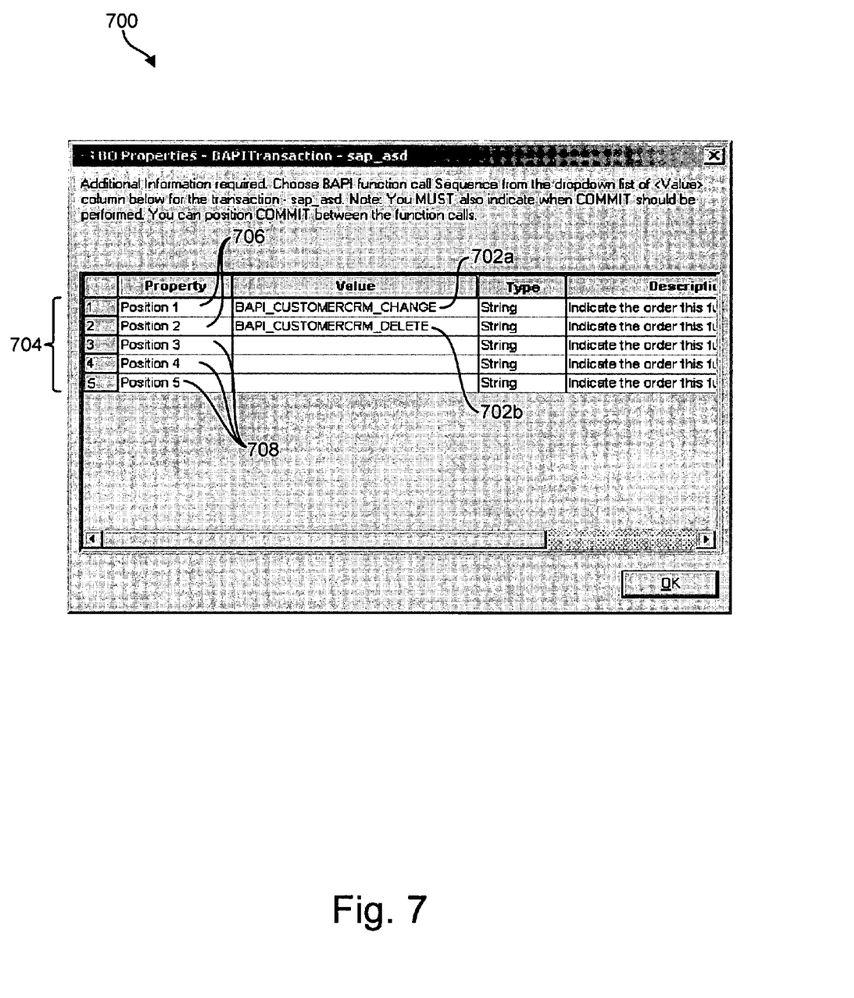
FIG. 7 is an illustration of one embodiment of a graphical user interface for organizing one or more function calls for inclusion in a transaction business object.

Referring to FIG. 7, one embodiment of a graphical user interface (GUI) 700, or window 700, of a transaction business object definition generation utility 600 is illustrated. In this embodiment, a user may establish an execution order 614 for several function calls 702a, 702b. The execution order 614 may be defined by the sequential numerical ordering of the positions 701.

Once a transaction business object definition 216 is selected for generation, the GUI 700 preferably provides multiple positions 704 for ordering these function calls 702a, 702b. Certain positions 706 may include the selected function calls while other positions 708 are empty. The function calls may be moved from filled positions 706 to empty positions 708 to adjust the ordering. Function calls may be moved using a drag-and-drop feature of the window 700 or by setting the position number under the property column.

In addition, a user may insert COMMIT operations after one or more of the function calls 702a, 702b. Preferably, the total number of positions 704 exceeds the number of function calls 702a, 702b so that at least one COMMIT operation can be added. In selected embodiments, because a COMMIT could potentially be desireable between each function call, the number of positions 704 may be twice the number of function calls 702a, 702b plus an extra position. Furthermore, the utility 600 may prohibit a user from entering the same function call 702a, 702b or COMMIT operation in two successive positions 704.

FIG. 8 provides an example of mapping data from a first function call into a second function call. Mapping may be helpful in situations where information created, modified, or retrieved, by one function call is needed or useful to another function call. For example, if a user desires to create a record for a new customer who shares some information (e.g., an address, phone number, etc.) of an older customer, this data mapping feature may allow data from the old customer to be imported into the new customer's record. In the illustrated example, a property 800 named "Customer_Number_1" from the "sap_bapi_customer_getlist" business object 802 may be mapped to a property 804 named "Customer_to_Be_Required" in the "sap_bapi_customer_getdetail" business object 806.

To create this mapping, a reference may be established in the metadata 304 (data mapping information 318) of the "sap_bapi_customer_getdetail" business object 806. For example, if the data mapping information 318 is labeled "ForeignBOKeyRef," indicating that the value is a reference to a foreign key, the data mapping information 318 for a "Customer_to_Be_Required" field may contain a path such as "sap_bapi_customer_getlistl. sap_addressdata/Customer_Number_1" that defines the source object and field and the destination field to establish data mapping between "Customer_Number_1" 800 and "Customer_to_Be_Required" 804.

Figure 9:
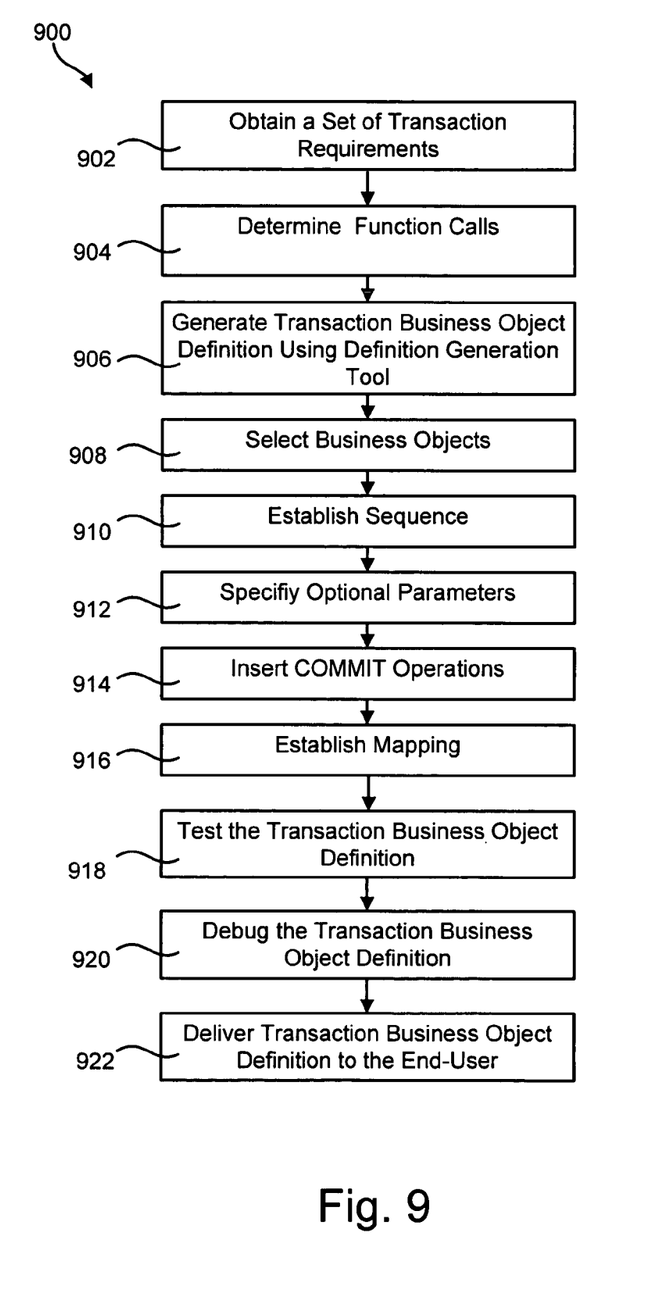
FIG. 9 is a flow chart illustrating one embodiment of a process for providing transaction business objects to end users.

Referring to FIG. 9, in selected embodiments, a service method 900 for providing transaction business objects 300 to end users may include obtaining 902 a set of transaction requirements from an end user. The transaction requirements define what the transaction should accomplish. A service provider may then determine 904 a set of function calls that satisfy the transaction requirements.

The service provider may then generate 906 a transaction business object definition 216 using a definition generation utility 600, such as that illustrated in FIG. 6. In one embodiment, the service provider selects 908 a set of business objects 302 for executing the function calls, establishes 910 an execution sequence for the function calls, specifies 912 optional parameters for the function calls, inserts 914 COMMIT operations after one or more function calls, and optionally establishes 916 data mapping between function calls.

Once the transaction business object definition 216 is generated 906, the service provider may test 918 the transaction business object definition 216 by instantiating the transaction business object 300 and completing a sample transaction. If needed, the transaction business object definition 216 may be debugged 920. Finally, once the transaction business object definition 216 functions correctly, the transaction business object definition 216 may be delivered 922 to an end user where it may be deployed in a business integration system 100. Alternatively, or in addition, the service provider may deploy and/or install the transaction business object definition 216. Preferably, the business integration system 100 includes an integration adapter 106 configured to processes transaction business objects 300 in accordance with the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method, the method implemented on a processor and a memory programmed for processing a data transaction using a single business object, the method comprising:

receiving a business object;

identifying the business object as a transaction business object, the transaction business object comprising a prefix, a suffix, or both the prefix and the suffix appended to a name of the business object that identifies the business object as a transaction business object, the transaction business object further comprising a single business object encapsulating a plurality of business objects corresponding respectively to a plurality of function calls to heterogeneous applications for performing an entire atomic transaction, the atomic transaction comprising an indivisible set of operations forming a logical unit of work that must be executed in the atomic transaction's entirety on the heterogeneous applications;

identifying unused parameters for the single business object;

determining an execution sequence for the plurality of function calls encapsulated in the single business object, the execution sequence defined by at least one operation designated by metadata encapsulated by the transaction business object;

removing function calls for the unused parameters;

inserting a COMMIT operation after at least one of the function calls of the plurality of function calls in the execution sequence, wherein two COMMIT operations are not successive;

mapping data from a source function call of the plurality of function calls to a target function call of the plurality of function calls in the execution sequence;

executing each of the function calls according to the execution sequence, wherein the plurality of business objects corresponding to the plurality of function calls to the heterogeneous applications are passed though an integration broker as a single business object; and executing one of the commit operation and a roll back operation to either commit or roll back each operation of the logical unit of work.

2. The method of claim 1, wherein identifying further comprises determining a type associated with the business object, the type identifying the business object as a transaction business object.

3. The method of claim 1, wherein the at least one operation designated by the metadata is selected from the group consisting of a create, retrieve, update, and delete operation.

4. The method of claim 3, the method further identifying the plurality of function calls corresponding to the at least one operation, the plurality of function calls stored in a transaction business object definition.

5. The method of claim 4, further comprising storing the transaction business object definition in an XML schema file.

6. The method of claim 1, wherein executing further comprises executing each of the plurality of function calls in the execution sequence during a single communication connection.

7. The method of claim 1, further comprising rolling back the plurality of function calls in the execution sequence in response to at least one of the plurality of function calls failing.

8. An apparatus for providing a transaction business object to an end user, the apparatus comprising:

a non-transitory computer readable storage medium storing computer usable program code;

a processor executing the computer usable program code, the computer usable program code comprising:

an integration adapter that receives a business object by way of the processor;

an identification module that identifies the business object as a transaction business object, the transaction business object comprising a prefix, a suffix, or both the prefix and the suffix appended to a name of the business object that identifies the business object as a transaction business object, the transaction business object further comprising a single business object encapsulating a plurality of business objects corresponding respectively to a plurality of function calls to heterogeneous applications for performing an entire atomic transaction, the atomic transaction comprising an indivisible set of operations forming a logical unit of work that must be executed in the atomic transaction's entirety on the heterogeneous applications, the function calls corresponding to an application interface for at least one of the heterogeneous applications, and the identification module identifies unused parameters for the single business object;

an sequencing module that determines an execution sequence for the plurality of function calls, the execution sequence defined by at least one operation designated by metadata in the transaction business object, inserts a COMMIT operation after at least one of the function calls of the plurality of function calls in the execution sequence, wherein two COMMIT operations are not successive, removes function calls for the unused parameter, and maps data from a source function call of the plurality of function calls to a target function call of the plurality of function calls in the execution sequence;

an execution module that executes each of the function calls according to the execution sequence, wherein the plurality of business objects corresponding to the plurality of function calls to the heterogeneous applications are passed though an integration broker as a single business object; and executing one of the commit operation and a roll back operation to either commit or roll back each operation of the logical unit of work.

9. The apparatus of claim 8, wherein identifying further comprises determining a type associated with the business object, the type identifying the business object as a transaction business object.

10. The apparatus of claim 9, wherein the at least one operation designated by the metadata is selected from the group consisting of a create, retrieve, update, and delete operation.

11. The apparatus of claim 8, wherein the transaction business object definition is stored in an XML schema file.

12. The apparatus of claim 8, wherein executing further comprises executing each of the plurality of function calls in the execution sequence during a single communication connection.

13. The apparatus of claim 8, further comprising rolling back the plurality of function calls in response to at least one of the plurality of function calls failing.

14. A computer program product comprising a non-transitory computer readable storage medium having computer usable program code stored thereon for processing a data transaction using a single business object, the computer program product including:

computer usable program code for receiving a business object;

computer usable program code for identifying the business object as a transaction business object, the transaction business object comprising a prefix, a suffix, or both the prefix and the suffix appended to a name of the business object that identifies the business object as a transaction business object, the transaction business object further comprising a single business object encapsulating a plurality of business objects corresponding respectively to a plurality of function calls to heterogeneous applications for performing an entire atomic transaction, the atomic transaction comprising an indivisible set of operations forming a logical unit of work that must be executed in the atomic transaction's entirety on the heterogeneous applications, the function calls corresponding to an application interface, the transaction business object encapsulating the plurality of function calls in the single business object such that the plurality of business objects corresponding to the plurality of function calls are passed though an integration broker as a single business object;

computer usable program code for identifying unused parameters for the single business object;

computer usable program code for determining an execution sequence for the plurality of function calls encapsulated in the single business object, the execution sequence defined by at least one operation designated by metadata encapsulated by the transaction business object;

computer usable program code for removing function calls for the unused parameters;

computer usable program code for inserting a COMMIT operation after at least one of the function calls of the plurality of function calls in the execution sequence, wherein two COMMIT operations are not successive;

computer usable program code for mapping data from a source function call of the plurality of function calls to a target function call of the plurality of function calls in the execution sequence;

computer usable program code for executing each of the function calls according to the execution sequence, wherein the plurality of business objects corresponding to the plurality of function calls to the heterogeneous applications are passed though an integration broker as a single business object; and executing one of the commit operation and a roll back operation to either commit or roll back each operation of the logical unit of work.

15. The computer program product of claim 14, wherein identifying further comprises determining a type associated with the business object, the type identifying the business object as a transaction business object.

16. The computer program product of claim 14, wherein the at least one operation designated by the metadata is selected from the group consisting of a create, update, and delete operation.

17. The computer program product of claim 16, further comprising identifying the plurality of function calls corresponding to the at least one operation, the plurality of function calls stored in a transaction business object definition.

18. The computer program product of claim 14, wherein the transaction business object definition is stored in an XML schema file.

19. The computer program product of claim 14, wherein each of the function calls in the execution sequence is executed during a single communication connection.

20. The computer program product of claim 14, further comprising rolling back the plurality of function calls in response to at least one of the plurality of function calls failing.

* * * * *